Patented Aug. 8, 1950

2,517,916

UNITED STATES PATENT OFFICE 2,517,916

BRANCHED CHAIN ACYCLIC ALDEHYDES AND ALCOHOLS AND THEIR PREPARATION

Albert Alan Pavlic, Claymont, Del., assignor to E. I. du Pont de Nemours & Company, Wilmington, Del., a corporation of Delaware No Drawing. Application December 15, 1947, Serial No. 791,942

8 Claims. (Cl. 260—601)

This invention relates to new compositions of matter and more particularly to highly branched, long chain aliphatic chemical compounds.

A variety of branched, long chain aldehydes and alcohols are known and they have been found useful as intermediates in the formation of various derivatives for use in many applications, for example, as surface-active agents, such as textile chemicals, anti-foam agents, wetting agents, and the like, as petroleum additives, synthetic lubricants, plasticizers, solvents, etc. In these various uses the known compounds have different degrees of effectiveness depending on their chain length and structure i. e., the type and degree of branching of the carbon chains. For some of these applications the hitherto known long chain alcohols and aldehydes and their derivatives are not entirely satisfactory; consequently, new long chain alcohols and aldehydes having new types of structure are desired.

This invention has as an object the production of new and useful compositions of matter. A further object is the production of new highly branched, long chain aliphatic chemical compounds. Still further objects reside in methods for obtaining these novel compounds. Other objects will appear hereinafter.

The objects of this invention are accomplished through the production of the highly branched 18-carbon atom aldehydes and alcohols 2-(1,3,3-trimethylbutyl) - 3 - hydroxy-5,7,7-trimethyloctanal, 2-(1,3,3-trimethylbutyl)-5,7,7-trimethyl-2-octenal, and 2-(1,3,3-trimethylbutyl)-5,7,7-trimethyloctanol. The hydroxy aldehyde of this invention is prepared by the aldolization of 3,5,5-trimethylhexanal in the presence of an aldolization catalyst. The unsaturated aldehyde is prepared from the hydroxy aldehyde by dehydration by heat, in the presence or absence of a dehydration catalyst. The saturated alcohol is prepared from the unsaturated aldehyde by hydrogenation in the presence of a metal of group VIII of the periodic table as catalyst.

A preferred method for preparing 2-(1,3,3-trimethylbutyl)-3-hydroxy - 5,7,7-trimethyloctanal consists in heating 3,5,5-trimethylhexanal in the presence of from 0.1% to 5% of its weight of an aldolization catalyst. The preferred type of catalyst is an acid-base catalyst such as an amine salt e. g., piperidine acetate or morpholine acetate. However, other catalysts which can be used include dilute or weak alkaline materials, for example, sodium hydroxide, potassium cyanide, sodium acetate, etc. With the preferred type of catalyst, i. e., with the amine salt type of acid-base catalysts, amounts of catalyst ranging from about 0.1% to 3% are used, but with the alkaline materials amounts ranging from about 0.5% to 5% are preferred. When the catalyst is added to the aldehyde, reaction takes place spontaneously with evolution of heat. After the heat of reaction subsides, the mixture is heated to a temperature of 50–90° C. for a period of 1 to 2 hours, after which the mixture is allowed to stand at room temperature for a period of about 1 week to complete the reaction. After removing the catalyst by washing with water, the reaction mixture is dried with a desiccant such as anhydrous sodium sulfate, and the unreacted 3,5,5-trimethylhexanal is then removed by careful heating at low pressure. Of course, if the aldol is to be used to prepare the unsaturated aldehyde as described below, it need not be isolated.

A convenient method for preparing 2-(1,3,3-trimethylbutyl)-5,7,7-trimethyl - 2 - octenal consists in heating the washed and dried reaction mixture obtained by the aldolization of 3,5,5-trimethylhexanal as described in the preceding paragraph at a temperature of from 50° to 100° C. During this heating any unreacted 3,5,5-trimethylhexanal is conveniently removed by fractional distillation. A catalyst is not necessary for this dehydration, but, if desired, a dehydration catalyst such as iodine can be employed. The resulting unsaturated aldehyde is purified by fractional distillation.

A preferred method for preparing 2-(1,3,3-trimethylbutyl)-5,7,7-trimethyloctanol consists in heating 2-(1,3,3-trimethylbutyl)-5,7,7-trimethyl-2-octenal in the presence of a solvent such as dioxane and a catalyst comprising nickel in the presence of excess hydrogen at a temperature of 50° to 200° C. at a pressure of 1500 to 2500 lbs./sq. in. The exact temperature and pressure employed depend on the particular type of catalyst used. With a nickel-on-kieselguhr catalyst temperatures of about 150° C. are preferred, while with a nickel alloy skeleton catalyst (a nickel catalyst prepared by dissolving out the aluminum from a nickel-aluminum alloy by means of caustic soda) the preferred temperature is about 100° C. While the nickel catalysts are preferred, the hydrogenation can be carried out with other metals of group VIII of the periodic table, such as, for example, platinum, palladium, ruthenium, cobalt and iron. With these other catalysts temperature and pressure used will vary with the particular catalyst being employed. For example, with platinum or palladium the lower temperatures, i. e., room temperature up to about 50° C., are operable. The hydrogenation can also be carried out in the presence of other solvents than dioxane; for example, tetrahydrofuran and alcohols can also be used. Although alcohols are operable as solvents they are less desirable since they tend to form acetals with the unsaturated aldehydes, thus lowering the yield of the desired saturated alcohol. While liquid phase hydrogenation is preferred, a vapor phase process can be used if desired. This latter type of process can be carried out by passing the vapor of the unsaturated aldehyde together with hydrogen through a heated tube packed with the hydrogenation catalyst. After the theoretical amount of hydrogen is absorbed by the unsaturated aldehyde the catalyst is separated from the reaction mixture and the resulting saturated alcohol is isolated by fractional distillation.

The 3,5,5-trimethylhexanal used as starting material for making the products of this invention can be prepared by carbonylation of diisobutylene by the following procedure: 125 parts of commercial diisobutylene is charged into a silver-lined reaction vessel with 10 parts of a reduced cobalt catalyst and reacted with a mixture of equal parts of carbon monoxide and hydrogen at 135–160° C. and 1100–1800 lbs./sq. in. pressure for 2 hours. After filtering off the catalyst, distillation of the reaction mixture yields 40–65% of the theoretical amount of 3,5,5-trimethylhexanal boiling at 82–83° C. at 35 mm.

The invention is further illustrated by the following examples in which the proportions of ingredients are expressed in parts by weight unless otherwise noted.

Example I

A reaction vessel capable of being heated externally is charged with 112 parts of 3,5,5-trimethylhexanal and 2 parts of piperidine acetate. The temperature of the mixture rises gradually to 35–40° C. The reaction mixture is then heated intermittently for 2 hours with the temperature maintained between 65° and 80° C. After this heating the mixture is allowed to stand at room temperature for one week. The catalyst is removed by washing with water, after which the reaction mixture is dried with anhydrous sodium sulfate. This mixture is treated with 2,4-dinitrophenylhydrazine, and there is obtained the yellow, difficultly crystallizable 2,4-dinitrophenylhydrazone of 2-(1,3,3-trimethylbutyl)-3-hydroxy-5,7,7-trimethyloctanal.

Example II

The crude condensation product from 112 parts of 3,5,5-trimethylhexanal prepared as described in Example I is washed with water to remove the catalyst, dried over anhydrous sodium sulfate and then distilled through an efficient fractionating column. The temperature of distillation is maintained above 100° C. which is sufficient to dehydrate the aldol to the unsaturated aldehyde. After removing 58 parts of unreacted 3,5,5-trimethylhexanal and the water formed by dehydration of the aldol at 15 mm. pressure there is obtained 52 parts of 2-(1,3,3-trimethylbutyl)-5,7,7-trimethyl-2-octenal boiling at 128–130° C. at 2 mm. pressure. This corresponds to a yield of 50% of the theoretical. This unsaturated aldehyde forms a red 2,4-dinitrophenylhydrazone melting at 108° C.

Example III

A steel reactor is charged with 50 parts of 2-(1,3,3-trimethylbutyl)-5,7,7-trimethyl-2-octenal, 100 parts of dioxane, and 10 parts of nickel-on-kieselguhr catalyst. This mixture is heated at 150° C., with agitation, under 2000 lbs./sq. in. hydrogen pressure for 3 hours. At the end of this time the theoretical amount of hydrogen has been absorbed. After separation of the catalyst, the reaction mixture is fractionally distilled and there is obtained 43 parts of 2-(1,3,3-trimethylbutyl)-5,7,7-trimethyloctanol, boiling at 135–137° C. at 2 mm. This yield corresponds to 87% of the theoretical. Analysis calculated for $C_{18}H_{38}O$: C, 80.0%; H, 14.16%; OH No. 207.5. Found: C, 79.83%, 79.81%; H, 14.23%; 14.18%; OH No. 210.7, 202.6.

The novel products of this invention are branched, long chain chemical compounds consisting of a straight chain of eight carbon atoms, the valence bonds of the first carbon of said chain being satisfied solely by carbon, hydrogen and oxygen, the second carbon of said chain being directly connected to a 1,3,3-trimethylbutyl group, the third carbon of said chain being directly connected to at least one member selected from the group consisting of hydrogen and hydroxyl, the fifth carbon of said chain being directly connected to one methyl group, the seventh carbon of said chain being directly connected to two methyl groups, and all the remaining free valence bonds of the carbon atoms in said chain being satisfied by hydrogen. These compounds possess unusual properties of value in certain applications. The aldehydes and alcohols of this invention are particularly useful as high boiling solvents and as intermediates for other chemical reactions. The derivatives of these products also possess valuable properties. Useful derivatives of this type include the esters with organic acids, e. g., acetic, adipic, and phthalic acids, and with inorganic acids, e. g., sulfuric acid. For example the sodium salt of the sulfate produced by reacting 2-(1,3,3-trimethylbutyl)-5,7,7-trimethyloctanol with chloro-sulfonic acid followed by neutralization with sodium hydroxide, is a water-soluble, white solid which has outstanding properties as a wetting agent, being superior to the dioctyl ester of sodium sulfosuccinic acid, a common commercial wetting agent. This sulfate of 2-(1,3,3-trimethylbutyl)-5,7,7-trimethyloctanol is disclosed and claimed in my copending application Serial No. 160,587, filed May 6, 1950.

As many apparently widely different embodiments of this invention may be made without departing from the spirit and scope thereof it is to be understood that this invention is not limited to the specific embodiments thereof except as defined in the appended claims.

I claim:

1. A 2-(1,3,3-trimethylbutyl)-5,7,7-trimethyl wholly acyclic 18-carbon-atom-compound having (a) a main chain of eight carbon atoms, (b) at most a single unsaturated carbon-to-carbon linkage which is ethylenic and is between the carbon atoms constituting positions 2 and 3 of said main chain, (c) an oxygen linked to the carbon atom constituting position 1 of said main chain and (d) at most a second oxygen which is linked to the carbon atom constituting position 3 of said main chain, said compound, apart from said one to two oxygen atoms, consisting solely of carbon and hydrogen atoms and being selected from the class consisting of 2-(1,3,3-trimethylbutyl)-3-hydroxy-5,7,7-trimethyloctanal, 2-(1,3,3-trimethylbutyl)-5,7,7-trimethyl-2-octenal and 2-

(1,3,3 - trimethylbutyl) -5,7,7 - trimethyl - 1-octanol.

2. 2 - (1,3,3-trimethylbutyl) -3-hydroxy - 5,7,7-trimethyloctanal.

3. 2-(1,3,3-trimethylbutyl) -5,7,7-trimethyl - 2-octenal.

4. 2-(1,3,3-trimethylbutyl) - 5,7,7 - trimethyl-1-octanol.

5. A process of preparing a 2-(1,3,3-trimethylbutyl) -5,7,7-trimethyl wholly acyclic 18-carbon-atom-compound having a main chain of eight carbon atoms which comprises heating and condensing two moles of 3,5,5-trimethylhexanal in the presence of an aldolization catalyst.

6. A process as set forth in claim 5 in which 2-(1,3,3-trimethylbutyl) - 3 - hydroxy-5,7,7 - trimethyloctanal is isolated therefrom.

7. A process of preparing a 2-(1,3,3-trimethylbutyl) -5,7,7-trimethyl wholly acyclic 18-carbon-atom-compound having a main chain of eight carbon atoms which comprises heating and condensing two moles of 3,5,5-trimethylhexanal in the presence of an aldolization catalyst, and dehydrating the resulting product producing 2-(1,3,3-trimethylbutyl)-5,7,7-trimethyl-2-octenal.

8. A process of preparing a 2-(1,3,3-trimethylbutyl)-5,7,7-trimethyl wholly acyclic 18-carbon-atom-compound having a main chain of eight carbon atoms which comprises heating and condensing two moles of 3,5,5-trimethylhexanal in the presence of an aldolization catalyst, dehydrating the resulting product, and contacting the dehydrated product with hydrogen in the presence of a hydrogenation catalyst at a hydrogenation temperature producing 2-(1,3,3-trimethylbutyl)-5,7,7-trimethyl-1-octanol.

ALBERT ALAN PAVLIC.

No references cited.